United States Patent [19]

Garcia et al.

[11] Patent Number: 4,781,231

[45] Date of Patent: Nov. 1, 1988

[54] PROTECTIVE HEATSHIELD KIT FOR VEHICLE DOORS

[76] Inventors: Kenneth M. Garcia; Teresa L. Rill, both of 2000 E. Roger Rd., Apt. I-68, Tucson, Ariz. 85719

[21] Appl. No.: 74,964

[22] Filed: Jul. 17, 1987

[51] Int. Cl.[4] ............................................. B60J 11/00
[52] U.S. Cl. .................. 150/52 K; 150/52 R; 280/770; 296/37.13; 224/42.11; 224/42.42
[58] Field of Search ............ 150/52 R, 52 K; 296/136, 37.13; 280/770; 224/42.11, 42.42 R

[56] References Cited

U.S. PATENT DOCUMENTS

| | | | |
|---|---|---|---|
| 1,523,323 | 1/1935 | Wensinger | 224/42.42 R X |
| 1,528,712 | 3/1925 | Ward | 150/52 K X |
| 1,781,034 | 11/1930 | Russell | 150/52 K X |
| 1,927,913 | 9/1933 | Bennett | 74/33 |
| 2,279,812 | 4/1942 | Bartlett | 135/5 |
| 2,455,237 | 11/1948 | Davis | 248/361 |
| 2,633,186 | 3/1953 | Jeckell | 150/52 R |
| 2,638,378 | 5/1953 | Molinaro | 296/136 |
| 2,639,751 | 5/1953 | Flaberty | 150/52 K |
| 2,716,433 | 8/1955 | Rawlings | 150/52 K |
| 2,950,749 | 8/1960 | MacDonald | 150/52 K |
| 3,298,712 | 1/1967 | Greenstadt | 150/52 K |
| 3,665,355 | 5/1972 | Sasaki et al. | 150/52 K X |
| 3,753,458 | 8/1973 | Lazarek | 160/354 |
| 4,209,197 | 6/1980 | Fischer | 150/52 K X |
| 4,216,989 | 8/1980 | Tackett | 150/52 K X |
| 4,458,738 | 7/1984 | Wilson | 150/52 M |
| 4,531,560 | 7/1985 | Balanky | 150/52 K |
| 4,589,459 | 5/1986 | Lantrip | 150/52 R X |
| 4,639,027 | 1/1987 | Boyd | 280/770 X |

FOREIGN PATENT DOCUMENTS 928869  6/1963  United Kingdom ............... 296/136

*Primary Examiner*—William Price
*Assistant Examiner*—Sue A. Weaver
*Attorney, Agent, or Firm*—Harry M. Weiss & Assoc.

[57] ABSTRACT

A heatshield apparatus for draping over a vehicle door. The heatshield apparatus is a heat-absorbing, protective cover designed to protect the user from the heat that builds up on the surface of a vehicle door when parked exposed to the sun. The cover is generally rectangular in form and is held in place to metallic surfaces by means of a plurality of magnets attached around the periphery as well as by velcro fasteners where metallic contact is not possible. The heatshield apparatus is provided with a cutout arrangement for accessing door panel accessories such as a door handle or side mirror control lever. The heatshield apparatus is further provided with pockets for personal items and a dual-purpose string for storage wrapping or secondary securement when in use.

7 Claims, 2 Drawing Sheets

PROTECTIVE HEATSHIELD KIT FOR VEHICLE DOORS

FIELD OF THE INVENTION

The present invention relates to a heatshield apparatus for draping over a vehicle door. More particularly, the heatshield apparatus is a heat-absorbing, protective cover designed to protect the user from the heat that builds up on the surface of a vehicle door when parked exposed to the sun. The cover is generally rectangular in form and is held in place to metallic surfaces by means of a plurality of magnets attached around the periphery as well as by VELCRO fasteners where metallic contact is not possible. The cover is interchangeable between left and right side vehicle doors and is provided with cutouts for accessing door panel accessories such as a door handle or side mirror control lever. The heatshield apparatus is further provided with pockets for personal items and a dual-purpose string for storage wrapping or secondary securement when in use.

DESCRIPTION OF THE PRIOR ART

A common driving habit on automobiles is to lower the automobile window and use the vehicle door as an armrest. During the summer months this habit is practiced very frequently eventhough the sun creates some discomforts to automobile owners due to the intense heat stored in the top door surfaces. This habit of driving with the arm resting on the vehicle door is quite common, especially in the hot and arid parts of the southwestern United States. Although, many automobiles are provided with air conditioners, there are probably an equal amount without air conditioners and another amount with broken air conditioners. Inadvertently, even if an automobile has an air conditioner, the car window will be lowered for a short period of time and the car door used as an armrest. For certain, if it is hot and a vehicle does not have an air conditioner, the vehicle door will be used as an armrest. The likelihood of placing the arm on a hot door panel and experiencing some discomfort is quite high if the panel has no means of protection to absorb the heat from the sun.

Although the concept of protecting the interior and exterior parts of an automobile from heat from the sun is known in the art, the prior art teachings have not addressed the vehicle door area used as an armrest when the window is rolled down. Rather, the prior art has taught heat protective cushions, seat covers, steering wheel covers and automobile covers. Typical of the interior type of prior art covers is U.S. Pat. No. 4,458,738 where an insulating type material is used to protect from the sun the automobile seat and steering wheel with a one piece cover. U.S. Pat. No. 2,279,812 teaches an automobile cover intended to cover the exterior body of an automobile. Other prior art teachings such as U.S. Pat. No. 1,927,913, are directed at covers to protect the interior parts of the automobile from getting soiled while being serviced by a mechanic.

Consequently, a need exists for a heatshield apparatus for draping over a vehicle door designed to protect the user from the heat that builds up on the surface of a vehicle door when parked exposed to the sun and the vehicle door is being used as an armrest.

It is therefore a primary object of the present invention to provide a heatshield cover for vehicle doors when said door is used as an armrest, especially during the hot summer months.

Another object of the present invention is to provide a detachable heatshield cover that can be easily utilized and stored away.

Yet another object is to provide a heatshield cover that provides pockets for storage of personal items and cutouts for accessing door panel controls.

SUMMARY OF THE INVENTION

The present invention provides a heatshield apparatus for draping over a vehicle door. Mor particularly, the heatshield apparatus is a heat-absorbing, protective cover designed to protect the user from the heat that builds up on the surface of a vehicle door when parked exposed to the sun. The cover is generally rectangular in form and is held in place to metallic surfaces by means of a plurality of magnets attached around the periphery as well as by VELCRO fasteners where metallic contact is not possible. The cover is interchangeable between left and right side vehicle doors and is provided with cutouts for accessing door panel accessories such as a door handle or side mirror control lever. The heatshield apparatus is further provided with pockets for personal items and a dual-purpose string for storage wrapping or secondary securement when in use. Accordingly, the present invention relates to a heatshield apparatus for draping over a vehicle door designed to protect the user from the heat that builds up on the surface of a vehicle door when parked exposed to the sun and the vehicle door is used as an armrest. The cover is enhanced by being provided with quick detachable means and personal features deemed attractive to an average user.

Therefore to the accomplishments of the foregoing objects, the invention consists of the features hereinafter fully described and particularly pointed out in the claims, the accompanying drawings and following disclosure describing in detail the invention, such drawings and disclosure illustrating, however, but one of the various ways in which the invention may be practiced.

DETAILED DESCRIPTION OF THE PREFERRED EMBODIMENT

Figure 1:
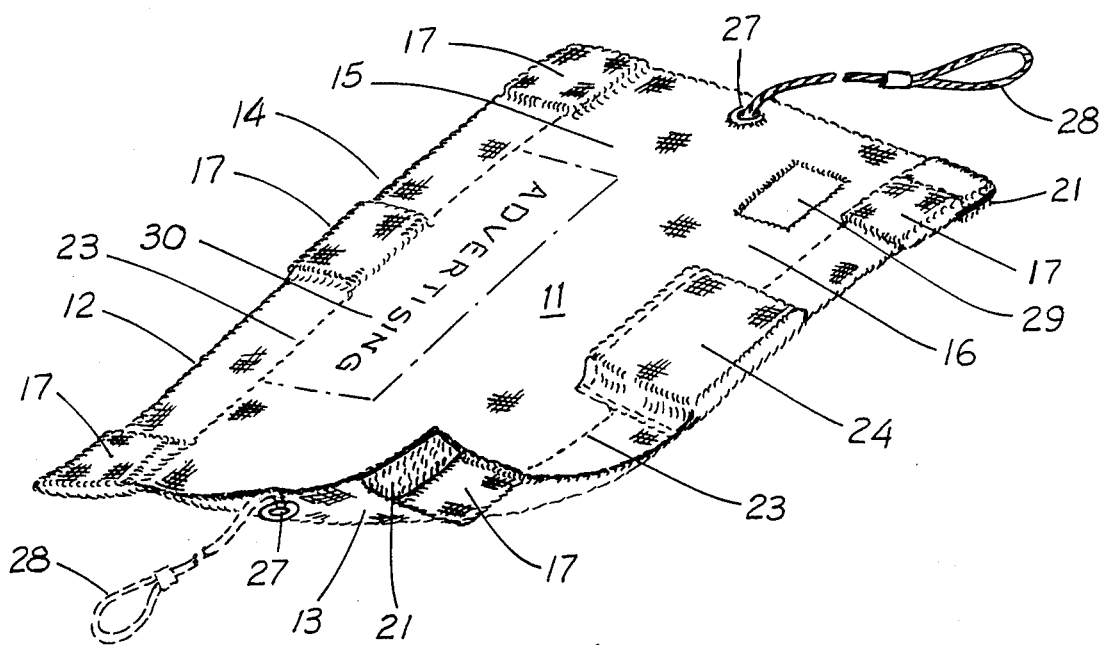
FIG. 1 is a plan view of the preferred embodiment of the invention showing primarily the outside portion of the present invention.

Referring now to the drawings and more particularly to FIG. 1, there is shown heatshield cover 11 fabricated from a heat-absorbing material 12, such as terry cloth. Cover 11 having an inside surface portion 13 intended as the cover side which makes contact with the inside of the door panel 20 and the outside of the vehicle door 19 and further shows the stitching 23. Similarly, cover 11 has an outside surface portion 14 which is intended to be attractive in appearance and provided with an area for advertisement 30, personal pocket 24 and the smoother border of cutouts 29. Cover 11, by necessity, has an exterior mounting portion 15 and an interior mounting portion 16. The periphery of mounting areas 15 and 16 is provided with a plurality of embedded magnets 17 which are intended for attachment to metallic surfaces such as exterior of vehicle door 19. Exterior mounting area 15 is also intended to provide a convenient place for advertising if desired. As previously mentioned, the interior portion 16 is intended for locating a pocket 24 for personal items. Also, in addition to the peripheral magnets 17 provided on interior portion 16, a VELCRO attachment means 21 is further provided for vehicles which do not have a magnetic inside door panel. Mating VELCRO pad 22 must be attached to door panel 20 in order to mate with pad 21.

Figure 2:
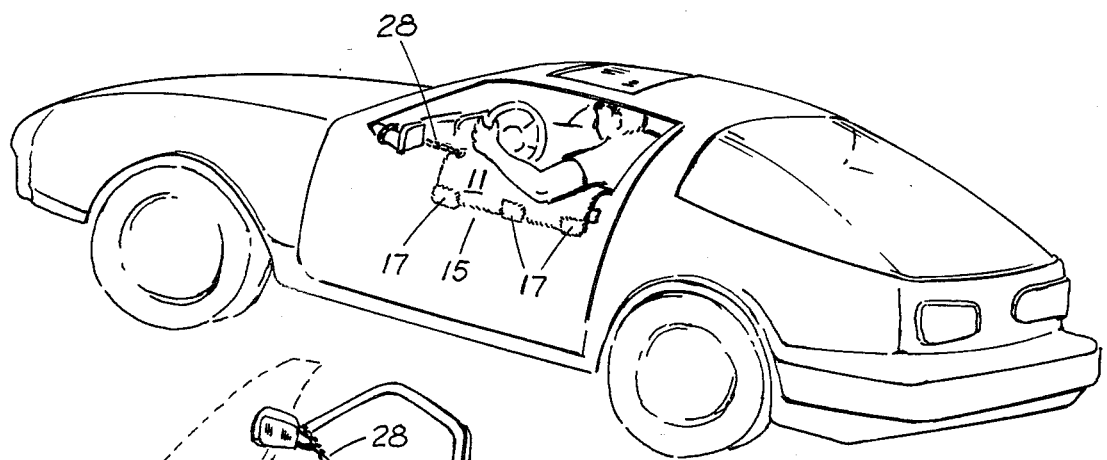
FIG. 2 is a view of an automobile with a driver illustrating the manner in which the present invention may be used and attached to the vehicle.
Figure 3:
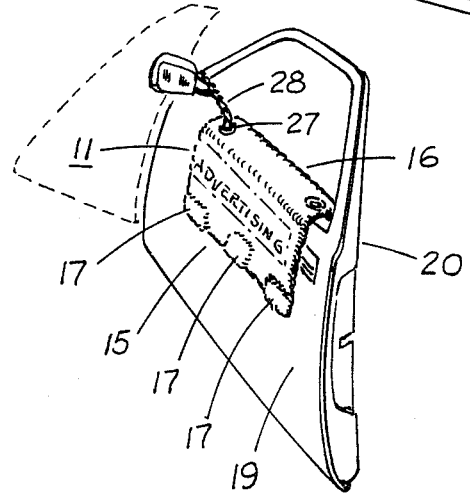
FIG. 3 is a perspective view of the vehicle door showing a closer view of the present invention attached thereto, emphasizing the primary and secondary securement means.
Figure 4:
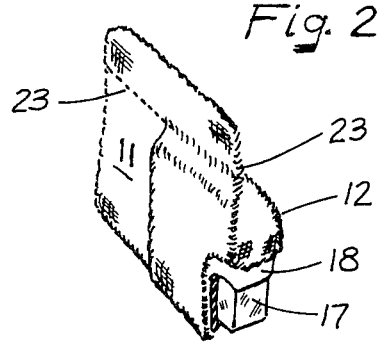
FIG. 4 is an enlarged broken sectional detail of one of the embedded magnets in the heatshield cover.
Figure 5:
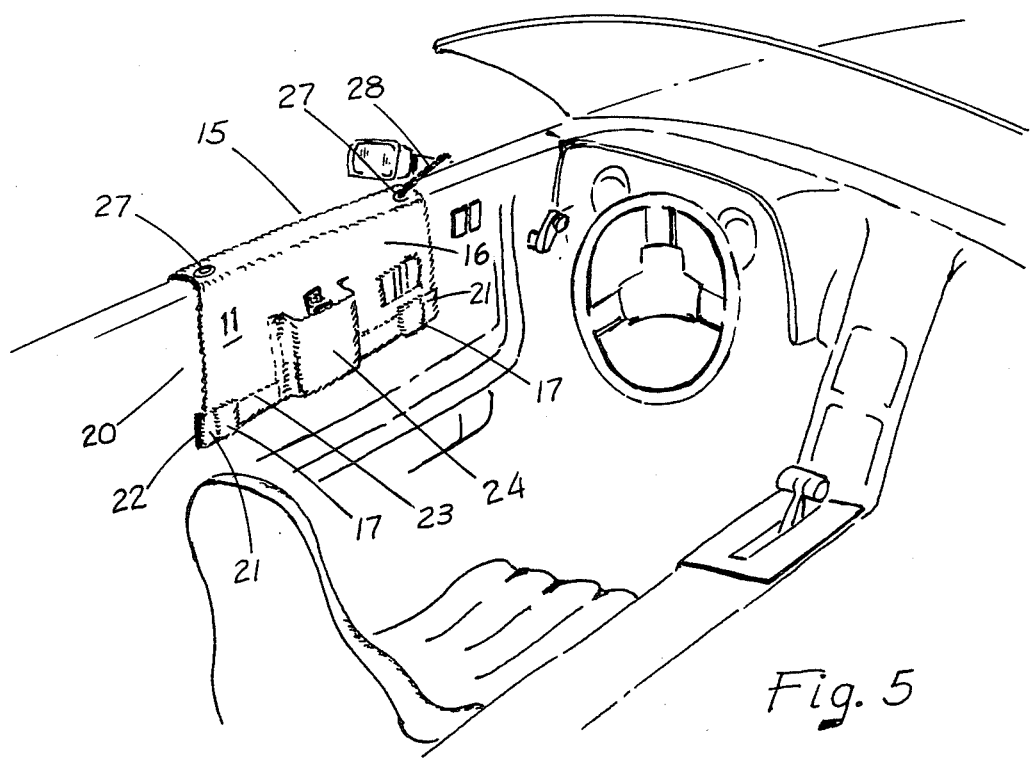
FIG. 5 is a view of the interior of a vehicle illustrating the attachment of the present invention on the vehicle door panel utilizing VELCRO attachment means, the personal item storage pocket and doorpanel accessory cutouts.
Figures 6, 7:
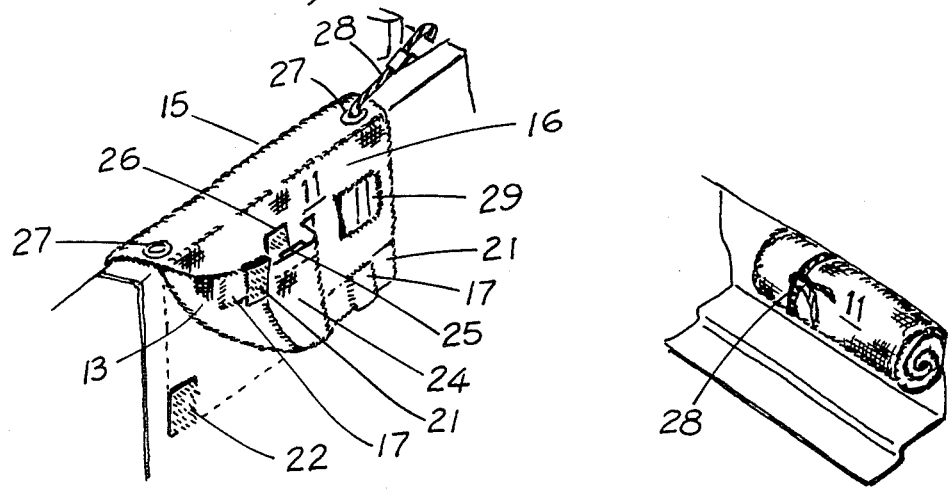
FIG. 6 is a perspective view of the interior portion of the vevicle door showing a closer view of the present invention attached thereto, emphasizing the VELCRO attachment means.
FIG. 7 is perspective view of an automobile glove box illustrating a suggested manner of storing the present invention.

FIG. 2 illustrates the use of cover 11 whereby a user in an automobile with the window lowered has an arm resting on cover 11 which has exterior portion 15 with magnets 17 attached to metallic door portion 19. Also shown at FIG. 2 is a secondary securement means, namely a string member 28 which is detachably connected forwardly or backwardly at eyelets 27 depending on whether cover 11 is being used on the right side of the vehicle. The secondary securement means is provided to assure inadvertent blowing away of cover 11 while being used and is shown attached to the rear view mirror of the vehicle. FIG. 3 provides a closer view of the illustrated application of cover 11 as attached to exterior door 19. FIG. 4 is intended to show a cutaway view of the detail associated with the embedding of magnets 17. In particular, insulating material 12 is constructed for embedding magnets 17 in a protective pad 18, such as a foam rubber material, which will protect the metallic surface from being scratched upon making contact with magnets 17. Stitching 23 will secure magnets 17 within protective pad 18. FIG. 5 shows the interior of an automobile illustrating the interior portion 16 of cover 11 as it attaches with VELCRO pad 21 and 22 to a non-metallic door panel 20. Magnets 17 are also provided on the interior door portion 16 for use on door panels 20 which may be metallic. FIG. 6 shows a close-up view of inside portion 16 whereat cover 11 is provided with magnetic pads 17, VELCRO pads 21 attached to underside 13, (mating pad 22 attached to door panel 20), a pocket 24 for storing personal items, pocket 24 being provided with a VELCRO pad 25 and mating VELCRO pad 26 for closing. Also shown in FIG. 6 is a cutout 29 which would provide access to door panel accessories such as a power window control switches or a door handle. FIG. 7 is a suggested manner for storing heatshield 11 in a vehicle glovebox using detachable string 28 to tie the rolled up cover 11.

Therefore, while the present invention has been shown and described herein in what is conceived to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

We claim:

1. A heatshield apparatus designed to protect a user's arm from the heat that builds up on the upper surface of that portion of a vehicle door housing the window in the open position when a vehicle is parked and exposed to the sun, said heatshield apparatus comprising:
   (a) a piece of heat absorbing material, formed in a rectangular shape to define an armrest cover, having an exterior mounting portion and an interior mounting portion;
   (b) a first attachment means attached to the periphery of said interior and exterior portions of said armrest cover for detachably mounting said cover onto said upper surface and the corresponding interior and exterior sides of said portion of said vehicle door;
   (c) a second attachment means attached to said interior mounting portion of said armrest cover to provide an alternative detachable mounting to the interior side of said vehicle door;
   (d) a third attachment means adapted to detachably attach to said armrest cover to secure said armrest cover to said vehicle to prevent inadvertent loss of said armrest cover.

2. A heatshield apparatus as recited in claim 1 wherein:
   said piece of heat absorbing material is terry cloth material, further including, an inside surface portion and an outside surface portion, said outside surface portion being provided with an area located on said exterior mounting portion to be used for advertisement,
   said outside surface portion being further provided with a pocket for storing personal items and having a closing means, comprising of a set of mating VELCRO pads, said pocket being located on said interior mounting portion,
   said interior mounting portion being further provided with a cutout arrangement for door panel accessories, such as door handles.

3. A heatshield apparatus as recited in claim 1 wherein:
   said first attachment means is a plurality of imbedded magnets in the periphery of said interior and exterior mounting portions of said armrest cover, said magnets being provided for detachably mounting onto the corresponding metallic interior and exterior surfaces of said portion of said vehicle door, said magnets being covered with a protective pad and attached to said periphery by stitching with a hemmed portion of said interior and exterior mounting portions, said protective pads intended to protect from scratching said metallic interior and exterior surfaces of said vehicle door.

4. A heatshield apparatus as recited in claim 1 wherein:
   said second attachment means is a plurality of strips of material sold under the tradename VELCRO, attached along the periphery of the inside surface of said interior mounting portion for detachable attachment to a plurality of mating halves of the trademane VELCRO material, said plurality of strips and mating halves of the tradename VEL- CRO material being provided for vehicles which do not have metallic inside door panels.

5. A heatshield apparatus as recited in claim 1 wherein said third attachment means is comprised of:
   a plurality of eyelets suitably located on said armrest cover; and
   a string having one end detachably tied to one of said plurality of eyelets, and the other end loose for user securement to said vehicle such as to an outside rear view mirror or for use as a tie string of said armrest cover when stored as into a vehicle glove box.

6. A heatshield apparatus designed to protect a user's arm from the heat that builds up on the upper surface of that portion of a vehicle door housing the window in the open position when a vehicle is parked and exposed to the sun, said heatshield comprising:
   (a) a piece of heat absorbing material, formed in a rectangular shape to define an armrest cover for said vehicle door portion, said cover having, an exterior mounting portion, an interior mounting portion, an inside surface portion and an outside surface portion,
   said outside surface portion being provided with an area located on said exterior mounting portion to be used for advertisement,
   said outside surface portion being further provided with a pocket for storing personal items and having a closing means, comprising a set of mating VELCRO pads, said pocket being located on said interior mounting portion;
   (b) a plurality of imbedded magnets in the periphery of said interior and exterior mounting portions of said armrest cover, said magnets being provided for detachably mounting onto the corresponding metallic interior and exterior surfaces of said portion of said vehicle door,
   said magnets being covered with a protective pad and attached to said periphery by stitching within a hemmed portion of said interior and exterior mounting portions, said protective pads intended to protect from scratching said metallic interior and exterior surfaces of said vehicle door; and
   (c) a plurality of strips of material sold under the tradename VELCRO, attached to said interior mounting portion along the periphery of said inside surface portion for detachable attachment to a plurality of mating halves of the tradename VELCRO material, said plurality of strips and mating halves of the tradename VELCRO material being provides for vehicles which do not have metallic inside door panels.

7. A heatshield apparatus designed to protect a user's arm from the heat that builds up on the upper surface of that portion of a vehicle door housing the window in the open position when a vehicle is parked and exposed to the sun, said heatshield apparatus comprising:
   (a) a piece of heat absorbing material, formed in a rectangular shape to define an armrest cover to said vehicle door portion, said cover having, an exterior mounting portion, an interior mounting portion, an inside portion and an outside surface portion, said outside surface portion being provided with an area located on said exterior mounting portion to be used for advertisement,
   said outside surface portion being further provided with a pocket for storing personal items and having a closing means comprising a set of mating VELCRO pads, said pocket being located on said interior mounting portion,
   said interior mounting portion being further provided with a cutout arrangement for door panel accessories, such as door handles;
   (b) a plurality of imbedded magnets in the periphery of said interior and exterior mounting portions of said armrest cover, said magnets being provided for detachable mounting onto the corresponding metallic interior and exterior surfaces of said portion of said vehicle door,
   said magnets being covered with a protective pad and attached to said periphery by stitching within a hemmed portion of said interior and exterior mounting portions, said protective pads intended to protect from scratching said metallic interior and exterior surfaces of said vehicle door;
   (c) a plurality of strips of material sold under the tradename VELCRO, attached to said interior mounting portion along the periphery of said inside surface portion for detachable attachment to a plurality of mating halves of the tradename VELCRO material, said plurality of strips and mating halves of the tradename VELCRO material being provided for vehicles which do not have metallic inside door panels;
   (d) a plurality of eyelets suitably located on said armrest cover; and
   (e) a string having one end detachably tied to one of said plurality of eyelets, and the other end loose for user securement to said vehicle such as to an outside rear view mirror or for use as a tie string of said armrest cover when stored as into a vehicle glove box.

* * * * *